July 29, 1952 J. H. HOMRIGHOUS 2,605,349

COLOR TELEVISION SYSTEM

Filed Dec. 8, 1949

INVENTOR.

John H. Homrighous

Patented July 29, 1952

2,605,349

UNITED STATES PATENT OFFICE 2,605,349

COLOR TELEVISION SYSTEM

John H. Homrighous, Oak Park, Ill.

Application December 8, 1949, Serial No. 131,866

3 Claims. (Cl. 178—5.2)

This invention relates to television system and more particularly to an improvement in television transmitters and receivers for the transmission and reception of color pictures.

A main object of my invention is to provide a practical and economical television system for the production of color images in close simulation of the colors in a scene being televised.

Another object of the invention is to provide a tricolor television system utilizing the present-day conventional method of synchronization and also the conventional method for the transmission and reception of signals representative of an audible message accompanying the pictures.

Another object of the invention is to provide a color screen or filter for the television camera or pick-up tube, commonly known as the "image orthicon," which screen comprises stripes of different color suitably arranged so that the image output signals from a single electron gun are representative of the different colors in the scene being televised.

Another object of the invention is to provide an improved cathode ray tube having a single electron gun to produce signals representative of the different colors on a motion picture film within the view of the tube.

Another object of my invention is to provide an improved television receiver for producing additive color images on the screen of a single cathode ray tube having a single electron gun.

Still another object of the invention is to provide an improved television receiving system for recording additive color images from the screen of a single cathode ray tube on a picture film sensitive to different colored light rays.

To provide an improved all electronic color television system with a cathode ray camera tube having a single electron gun and a cathode ray viewing tube having a single electron gun is another object of my invention.

A further object of my invention is to eliminate the need for registering or properly aligning the different partial images at both the transmitter and the receiver by developing complete composite images on the screen of a single cathode ray tube at the transmitter representative of different colors in the scene being televised and complete composite color images on the screen of a single cathode ray tube at the receiver.

Some of the more important advantages of the invention are as follows:

A single beam three-color direct-view tube may be employed at the receiver.

Present-day television transmitters for black and white picture transmission may be converted for transmission of pictures in color by simply substituting for the camera tube a new single beam three-color camera tube.

Present-day television receivers for black and white picture reception may be converted for color reproductions by simply substituting for the viewing tube a new single beam direct-view three-color tube.

Each line scan at the transmitter may produce picture signals representative of different colors and at the receiver the corresponding line trace may produce light rays of different color, whereby, each picture field or frame may be representative of different colors in the scene being televised or show images reproduced in natural colors to avoid registry of different partial images.

Interlace scanning for odd line and even line fields with sixty multi-color fields or thirty multi-color frames per second and five hundred and twenty-five lines per frame may be employed utilizing present-day circuits and synchronizing signals.

The larger sizes in direct-view picture tubes may be employed in the color television system described herein.

There have been a number of color television receiving systems developed wherein a single cathode ray tube with several electron guns are employed to produce images in color on one or more screens using two or more phosphors. Other systems have used different phosphors in strips across the cathode ray tube screen. But, in none of these systems are the colored light rays from each series of a number of repeating series of two or three lines or strips of phosphor combined and directed to a single line or strip on the viewing side of the image screen.

There has also been developed a color television transmitting system employing a separate pickup tube with color filter for each primary color, and other systems have been developed which direct light rays from a scene to several different areas on the screen of a single pickup or cathode ray camera tube. But, in none of these transmitting systems have the light rays from a scene been utilized to produce complete composite images on the screen of the camera cathode ray tube.

In this application I describe an all electronic color per line sequential system and a multi-color per line system. In the latter system each line scanned at the transmitter may produce picture signals representative of different colors according to the way the colors appear in the scene being televised, and at the receiver each line trace may produce the different colors as they appear in the scene.

Messages in this specification are to be understood to include any intelligence represented by sound or picture signals.

Other objects and advantages will appear from the following description taken in connection with the accompanying drawings in which.

Figures 1, 2, 3, 4:
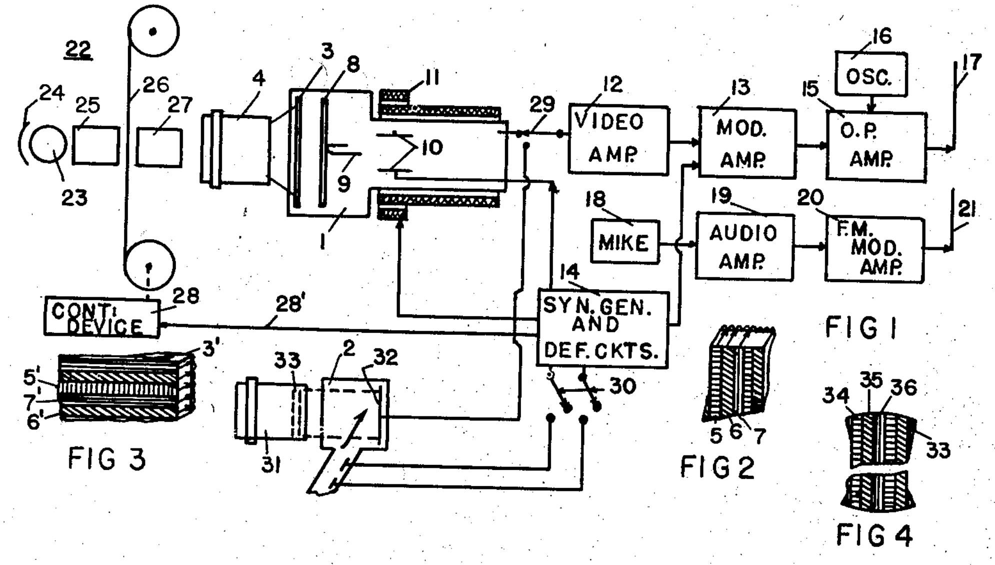
Figures 1 and 5 are simplified block and circuit diagrams of a television transmitting station and a receiving station respectively, illustrating the principles applied in this invention.
Figures 2, 3, 6 and 7 are detail partial views of the cathode ray tube screens employed in this invention.
Figure 4 is a plan view of a color filter or screen.

Figure 1 shows a block and circuit diagram for a color television system having an improved pick-up or cathode ray camera tube 1 which may be known as the "image orthicon" or a more conventional cathode ray tube 2 known as the "iconoscope" may be employed. The image orthicon may be in general as described in Patent No. 2,213,175 issued August 27, 1940 to Iams and Rose or according to a later type as described in "Electronic Industries" December 1945 issue. The present improvement in the image orthicon comprises the member 3 immediately inside the glass envelope. This member of thin glass has a photosensitive emitting surface on the back, on the front side facing the lens 4 there may be ruled a number of series of adjacent colored lines preferably in a vertical direction as illustrated in Figure 2, with each series of lines comprising the primary colors blue, green and red as shown for the lines 5, 6 and 7. Light rays from a scene may be focused by the lens 4 on the sheet or plate 3 passing through the stripes or colored lines thereon to the photosensitive material on the opposite side of the sheet 3 to in turn produce on the target or image screen 8 composite images representative of the different colors in the scene being televised.

The number of colored vertical lines or the number of series of lines on the member 3 determine the picture detail that may be obtained. The elemental areas scanned in each horizontal line transverse the stripes of different color may be equal to the number of stripes. Furthermore, the stripes instead of being ruled vertically from top to bottom of the screen may be at some other angle and may vary in width. The stripes or lines of different color may be printed on a thin sheet of cellophane which is secured to the member 3.

An electron ray indicated at 9 directed toward the image screen 8 may be deflected by a pair of deflecting plates 10 and the deflecting coil 11 so that the ray is caused to scan the screen. Picture signals are thereby developed and fed to a video amplifier 12, from the amplifier 12 the video or picture signals are fed to the modulation amplifier 13. Synchronizing signals from the synchronizing generator 14 may be fed to the modulation amplifier 13. From the amplifier 13 the picture and synchronizing signals may be supplied to the output amplifier 15. A carrier wave is provided by the oscillator 16. In the output amplifier 15 this carrier wave is modulated by the picture signals and synchronizing signals which are fed to the antenna 17.

Sound signals produced by the microphone 18 may be amplified in the audio stage 19 and fed to the frequency modulation amplifiers 20, from the amplifiers 20 the sound signals may be supplied to the antenna 21.

The synchronizing generator and the deflecting circuits 14 may produce synchronizing signals and saw tooth waves according to present-day television standards, or the saw tooth waves and synchronizing signals may be as described in my application Serial No. 621,250 filed October 9, 1945, now Patent No. 2,521,009 issued September 5, 1950, and further description is thought to be unnecessary.

The reference numeral 22 designates a moving picture projecting mechanism comprising a source of light 23, reflector 24 and lens 25 for projecting color image or subject matter from the film 26 through the lens 27 to the plate or member 3 to produce images on the image screen 8 representative of the different colors in the film 26. The film 26 may be driven by the control device 28, which device may be under control of the frame synchronizing signals supplied over conductor 28′. The projecting mechanism 22 and the control device 28 may be of conventional type or they may be similar to those described in my application Serial No. 476,897 filed February 24, 1943, now Patent No. 2,524,349 issued October 3, 1950.

In Figure 3 for an alternate system there may be ruled a number of series of adjacent colored lines, each series comprising the primary colors blue, green and red, as illustrated by the stripes 5′, 6′, and 7′ for one series, and extending horizontally crosswise the screen or at some other angle so that the electron ray in each forward trace may follow one of the stripes, the number of stripes to equal the number of scanned lines per frame.

In place of the image orthicon 1, an iconoscope tube 2 may be substituted by operation of the switches 29 and 30. Light rays from a scene or subject matter may be focused by the lens 31 onto the mosaic 32 passing through the color filter 33 to produce complete composite images representative of the different colors in the scene being televised.

The color filter 33 associated with the lens 31 may be a thin sheet of transparent material: for instance, cellophane, having ruled thereon or otherwise applied a multiplicity of series of stripes of different color with the different stripes or lines of each series comprising the primary colors blue, green and red as illustrated for the series of stripes 34, 35 and 36 in Figure 4. This color filter 33 may be rotated so that the stripes are substantially horizontal for parallel scanning.

Figure 5:
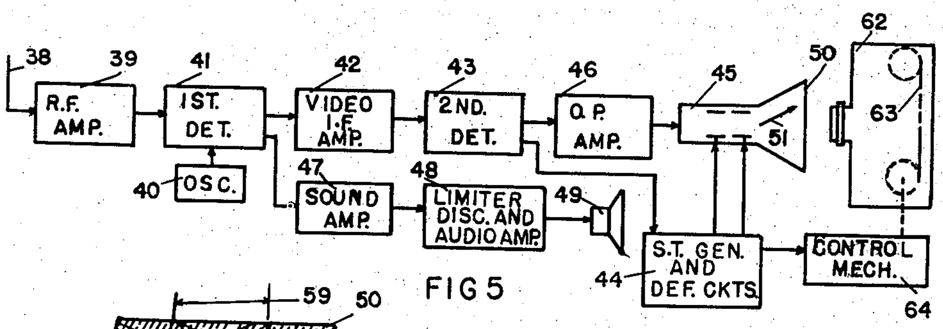

With reference to Figure 5, showing a television receiving station, the antenna 38 receives the carrier signals from the transmitter to a radio frequency amplifier 39, an oscillator 40 reacts with these signals in the first detector stage 41 on the heterodyne principle to produce a first intermediate frequency which is applied to the video amplifier 42. After suitable amplification in the stage 42 the picture signals and synchronizing signals are demodulated at 43. The synchronizing signals being of greater amplitude are separated and fed to the saw tooth wave generators 44 to control the scanning actions in the viewing tube 45. The video signals from the second detector 43 are supplied to the output amplifier 46. After suitable amplification in stage 46 the video signals may be fed to the cathode ray tube 45.

A second intermediate frequency may be fed from the first detector 41 to the intermediate frequency amplifier 47. After suitable amplification in stage 47 the sound signals may be fed through a limiter, discriminator and audio stages 48 for detection and amplification. From the stages 48 the sound signals may be fed to the loud speaker 49.

The viewing tube is represented as being in the form of a cathode ray tube having an improved image screen 50, which will be more fully explained later. The tube may be provided with an electron gun, not shown, to produce a ray of electrons directed toward the screen as indicated at 51 and two sets of plates for deflecting the electron ray or beam at the line and field frequencies to cause it to scan the screen.

The cathode ray tube illustrated at 45 may in general be similar to a conventional picture or kinescope tube except for the image screen 50. This tube is described in my concurrently filed application Serial No. 131,865. The screen 50 may have on its inner face a plurality of grooves or lenticular lenses preferably extending vertically or from top to bottom across the screen as illustrated in Figure 6.

Figure 6:
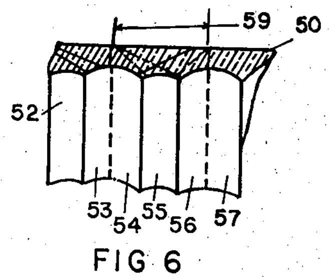

With reference to Figure 6 showing an enlarged fragmentary portion of the screen 50 certain of the grooves 52, 53—54, 55 and 56—57 are illustrated. The grooves may be considered in sets or series of three and the inner face of the screen may have a number of such series of grooves across the screen with at least three grooves in each series. The grooves of each series may have different phosphors to yield light rays of different color; for instance, the grooves in each series may be similar to the grooves 54, 55 and 56 where the grooves 54 may have a phosphor to yield blue light rays upon activation by electrons, the groove 55 may have a phosphor to yield green light rays and the groove 56 may have a phosphor to yield red light rays.

The grooves are preferably circular of different size or radius having the different phosphors ruled or otherwise placed therein with a conventional aluminized or metalized back covering the whole screen so that each of the grooves in a series becomes a small convex mirror in order to better combine and direct the different light rays in each series of grooves to substantially a single strip or line on the viewing side of the screen as illustrated for the strip 59 on the opposite or viewing side of the screen. The next succeeding set of grooves or elongated surfaces may start with groove 57 for blue light rays.

The grooves for each series of three strips of phosphor are preferably of such curvature as to combine or direct the light rays from one or more of the phosphors, upon activation by electrons, to a single strip or line on the viewing side of the screen for additive color effects and also to distribute the light rays from one or two phosphors in a series to a strip on the viewing side of the screen substantially equal to the combined width of the three strips of phosphor in a series, so that where a particular color is sampled a number of times, or every third stripe at the transmitter, a continuous strip or line of that particular color may be produced on the viewing side of screen.

The number of vertical grooves or phosphor strips on the viewing tube screen corresponds to the number of the vertical stripes on the screen associated with the cathode ray pick-up tube with the colors for each series in the same sequence, so that each line scanned at the transmitter may produce picture signals representative of different colors in the order that the colors appear in the scene being televised at the receiver each line trace produces in the same order the different colors on the viewing tube screen.

The picture signals from the transmitter Figure 1 for any color may be spaced or transmitted in recurring periods of time, but where great detail is required a relatively large number of stripes may be provided on the screen, whereby the spacing between elemental areas reproduced may be small as compared with the resolving power of the normal eye. Therefore, the transmitted picture signals representative of different colors may be utilized in a conventional television receiver for reproduction of images in monochrome.

Figure 7:
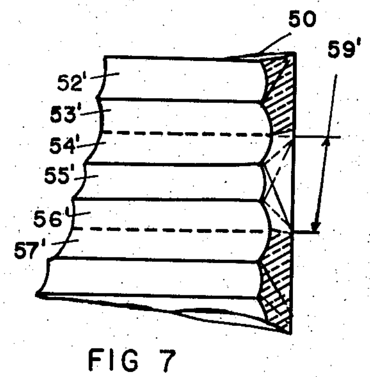

Figure 7 shows an enlarged fragmentary portion of the screen 50 with the different grooves extending crosswise the screen, whereby the electron ray in each forward deflection may trace a single groove or line of phosphor. The grooves are arranged in a number of series or sets with each series having phosphors to produce light rays for the three primary colors; for instance, the phosphors for the grooves 54′, 55′ and 56′ may yield blue, green and red light rays respectively, upon activation by electrons, which rays may be combined and directed to a single strip on the opposite side of the screen as illustrated at 59′.

The number of horizontal strips or grooves crosswise the viewing tube screen would equal the number of horizontal stripes on the screen associated with the cathode ray pickup or camera tube also the strips would equal the number of scanned lines per frame.

Figure 8:
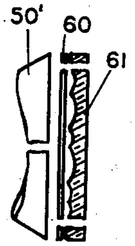
Figure 8 is a color filter and associated lenticular lens member.

A conventional type cathode ray tube with a screen for black and white images may be employed with a color filter 60 and a lenticular lens member 61 as illustrated in Figure 8. The cathode ray tube screen 50′ may be of conventional type for black and white images with a color filter 60 of thin material, such as cellophane, having a number of series of stripes or lines of different color ruled or printed thereon, similar to screen 33 in Figure 4 and disposed between the screen and the lens member 61. The member 61 comprises a number of series of grooves or lenses, similar to the screen in Figure 7, so that light rays from the images on screen 51 passing through the filter 60 may be combined on the outer-face of member 61 for image reproduction in natural color similar to the method described for Figures 6 and 7. The filter 60 and member 61 may be disposed so that the stripes and grooves are in a horizontal direction or a vertical direction. The filter 60 and the lenticular lens member 61 are described in my above-mentioned application for cathode ray tube.

The motion picture camera 62 may be provided with a film 63 sensitive to light rays of different color to record the colored images appearing on the cathode ray tube screen. The film control mechanism 64 may be under control of the frame synchronizing signals from 44. This camera and control mechanism may be of any suitable type or they may be similar to that described in my application Serial No. 794,188 filed December 12, 1947.

The embodiments of the invention which have been given herein are illustrations of ways the various features may be accomplished and of the principles involved. It is to be understood that the invention contained herein is capable of embodiment in many other forms and adaptations, without departing from the spirit of the invention and the scope of the appended claims.

I claim as my invention:

1. In a color television system, a transmitting station, a cathode ray camera tube associated with said station having an image screen, said screen comprising a transparent sheet having on one side photo-sensitive material, and on the opposite side a plurality of colored light filter strips arranged in a repeating series of three different color strips to produce for each series of strips, depending on the color in the scene being televised, a set of one or more discrete images in said photo-sensitive material, means including a source of electrons in said tube to produce a beam of electrons, means to cause said beam of electrons to scan said sets of images in successive rotation to produce picture signals representative of said different sets of images, means to transmit said picture signals, a receiving station, means in said receiving station to receive said picture signals, a cathode ray picture tube associated with said station provided with a viewing screen, said viewing screen having on its inner face a repeating series of grooves with the several grooves for each series provided with different phosphors adapted to fluoresce upon activation by electrons to produce a different colored light ray in each groove of a series, said series of grooves being equal in number to said series of color strips at said image screen, the said grooves of each series being of such curvature as to mix the light rays of different color from their associated phosphors, a source of electrons in said tube to produce an electron beam directed toward said viewing screen, means to cause the electron ray, varied according to said picture signals, to scan said series of grooves in synchronism with the scanning of said sets of images at said transmitting station to produce images in blended color on the outer-face of said viewing screen.

2. A color television system according to claim 1, wherein the scene being televised is recorded in different colors on a moving picture film, and in addition there is provided a picture projector associated with said camera tube, said projector having a film control device, and means including said control device to move said film within the view of said camera tube.

3. A color television system according to claim 1, and in addition there is provided a photographic recorder focused upon said viewing screen comprising a color film sensitive to different colored light rays for making a record in different colors, said recorder having a film control mechanism, and means including said control mechanism to control the movement of said film for recording the images appearing on said viewing screen.

JOHN H. HOMRIGHOUS.

REFERENCES CITED

The following references are of record in the file of this patent:

UNITED STATES PATENTS

| Number | Name | Date |
|---|---|---|
| 2,073,379 | Goldsmith | Mar. 9, 1937 |
| 2,275,898 | Goldsmith | Mar. 10, 1942 |
| 2,296,908 | Crosby | Sept. 29, 1942 |
| 2,431,115 | Goldsmith | Sept. 18, 1947 |
| 2,479,820 | DeVore | Aug. 23, 1949 |
| 2,531,031 | France | Nov. 21, 1950 |
| 2,532,511 | Okolicsanyi | Dec. 5, 1950 |
| 2,538,071 | Young | Jan. 16, 1951 |